Patented Nov. 9, 1937

2,098,764

UNITED STATES PATENT OFFICE 2,098,764

PROCESS OF MANUFACTURING CREAM CHEESE

Caspar P. Sharpless, Swarthmore, Pa., assignor to Milk Processes, Inc., Philadelphia, Pa., a corporation of Pennsylvania No Drawing. Application November 25, 1935, Serial No. 51,499

10 Claims. (Cl. 99—116)

The present invention relates to the manufacture of soft cheese of the character of cream cheese and food product spreads of which the ingredients of cream cheese form the base. Such foodstuffs will be referred to hereinafter as cream cheese.

In the conventional manufacture of cream cheese in this country, ingredients consisting, for example, of cream, skim milk and whole milk are ordinarily pasteurized and passed together through a homogenizer of the conventional type used in the creamery industry by a process involving discharge of materials to be homogenized from the nozzle of the homogenizer at a pressure in excess of 2,000 pounds. The material discharged from the homogenizer is then cooled and starter, rennet and salt are added to this material, which is then aged for a period sufficient to effect development of the desired degree of acidity. It is thereafter cooked at a temperature of 120 to 140° F. for a period sufficient to break the curd in order that the whey may be drained therefrom. At the conclusion of the cooking operation the mixture is placed in porous bags and the whey separated from the other ingredients by drainage from these bags. The material in the bags is pressed and after this pressing operation the material remaining in the bags is in the form of the desired cream cheese.

The practice of a process of this character involves an inevitable loss of a certain portion of the butter fat contained in the mixture under treatment by passage of such butter fat with the whey through the bags. It also involves substantial difficulty in attempting to obtain a desired degree of acidity and a resulting uniform flavor in the production of the cheese. This difficulty of acidity control is caused by the difficulty of controlling conditions in the delicate manner required to attain a predetermined degree of acidity during the aging step of the process.

Objects of the present invention have been to avoid the substantial loss of butter fat which is involved in the process discussed above and to produce a product whose acidity and flavor can be controlled to a very delicate degree.

A further object of the invention has been to produce a cream cheese of superior taste and texture, and a cream cheese having excellent keeping qualities. When ordinary cream cheese becomes spoiled during storage or shipment, the satisfactory reclamation of the butter fat of that cheese is not commercially feasible, and a further object of the present invention has been to produce a cream cheese and method of reclaiming its butter fat content by which such butter fat content can be recovered in dispersed phase in a form in which it can be satisfactorily utilized in the manufacture of cream cheese or other products.

A fundamental feature of the practice of the invention consists in the preparation of a composition including the ingredients desired in the finished cream cheese but excluding excess moisture and all other products which might, if included, require subsequent removal from the composition. Processes having this general advantage have been proposed heretofore, but the proposals embodying them have been subject to one or more of a number of objections, of which the following may be noted:

1. The presence of a substantial proportion of milk sugar with its resultant impairment of the keeping qualities of the cheese.

2. The presence of an insufficient ratio of casein to give the cheese the desired flavor and texture and stabilizing effect upon its butter fat content.

3. The development of acidity in an imperfectly controlled manner, thereby resulting in an erratic product which may contain a larger or a smaller proportion of edible acid than the proportion of such acid desired.

The practice of the present invention avoids all of these difficulties and results in the production of a product which is superior in texture and flavor both to the products of prior art processes and to the products of proposed processes avoiding expulsion of liquid.

In the practice of the present invention ingredients containing the desired constituents of the cream cheese and including casein, water, butter fat and edible acid of the character ordinarily present in butter and cream cheese are mixed together in the ratio in which they are desired in the finished product. The edible acid is introduced in approximately the ultimately desired ratio and the mixture produced is preferably subjected to a treatment such as pasteurization to avoid development of increased acidity, such acidity stabilizing treatment being effected at a time shortly subsequent to the addition of the acid. By the addition of edible acid in this ratio and the curtailment of the development of additional acidity, the acid flavor of the product can be maintained within very narrow predetermined limits. The stabilization of acidity may alternatively be attained by the addition of the acid containing substance in a stabilized form, i. e., after stirilization of such substance.

While various sources of butter fat can be used in the practice of the invention within its broad scope as discussed in the last preceding paragraph, important advantages are attained by the use as a source of butter fat of a cream product of the character described in the U. S. patent to Wendt, Reissue No. 19,123. This cream product may be employed in either a plastic or liquid condition within the broad scope of the invention.

By the use of a cream of this character in conjunction with edible casein, starter, salt and a stabilizing compound such as agar-agar or a gum such as locust bean gum, stable cream cheese is produced having a smooth creamy texture and delicious flavor.

The preferred practice of the invention thus involves compounding a true cream containing over 65% butter fat with an edible casein which may be obtained from any desired source, (e. g. cottage cheese, powdered edible casein or moist edible casein which has not been subjected to a drying operation), starter in the form of cultured milk, butter milk or other material employed as a source of edible acid in the dairy industry, liquid in the form of water or skim milk, and a curd stabilizer in the form of agar-agar or locust bean gum. A small proportion of sodium citrate, e. g. 0.1–0.5% may also be added to give the finished cream cheese a smoother texture. The composition so formed is preferably heated to a pasteurizing temperature and homogenized at a temperature ordinarily used for homogenizing operations of this general character, e. g., 120–175° F. At the conclusion of the homogenizing operation, the resulting material is packed in containers for storage, sale or shipment and cooled. It has been found that the use of a cream having the butter fat content of the above-mentioned Wendt Patent in a process of this character yields a product of superior texture, flavor and stability to corresponding products produced in an analogous manner, but in which butter or butter oil is used as a source of butter fat. Such product is not subject to the objectionable oiling tendency encountered in manufacture and use when butter or butter oil constitutes the butter fat source.

A further feature of the invention consists in the performance of the homogenizing step in such a manner as to avoid breaking up of the butter fat particles into the fine form in which they ordinarily exist in cream cheese. As stated above, the manufacture of cream cheese by prior art procedure involves ejection from the nozzle of a conventional cream homogenizer from a pressure in excess of 2,000 pounds per square inch to approximately atmospheric pressure. Such ejection effects a very violent mixing and breaking up operation and causes the butter fat particles to be broken up in such a manner that their size is only a fraction of the size of the butter fat particles in ordinary cream.

When butter fat particles are broken up and dispersed to this high degree, it is impossible thereafter to effect efficient concentration thereof in the liquid with which they are admixed. As a consequence, cream cheeses made by a process involving this high degree of homogenization cannot be treated in such a manner as economically to reclaim the butter fat which they contain in a usable form.

In the practice of the present invention a much milder homogenizing effect is utilized than in the practice of the prior art. Such mild homogenization is feasible in a case in which a true cream such as that described in the above Wendt patent is used in place of butter or butter oil, for the fact that this product is a true cream makes it possible to effect adequate dispersion of the butter fat in the other ingredients of the cream cheese without recourse to an homogenizing operation of the order of intensity employed in the prior art. As a result of the use of an homogenizing operation in which the butter fat particles are not too finely broken up, these butter fat particles can be reclaimed from the cream cheese in dispersed phase in case such reclamation is deemed necessary. Thus, if cream cheese produced in this manner becomes spoiled in storage or shipment, it may be diluted with hot water or other aqueous liquid, subjected to a neutralizing operation to reduce its acidity to a range within which the curd present does not preclude efficient centrifugation, and centrifuged at a temperature in excess of the melting point of butter fat to produce a butter fat containing liquid of the character of cream containing the butter fat of the cream cheese in a desired proportion. In connection with such an operation, it is preferred to reduce the acidity of the mixture of hot aqueous liquid and cream cheese to less than 0.2%, as such reduction of acidity is usually essential to avoidance of cloggage of a centrifugal separator by the curd present in cream cheese.

Any desired type of mixing operation which is capable of effecting a thorough mixture of the ingredients of the cream cheese without reducing the butter fat particles to such small size as to inhibit subsequent efficient separation may be employed in the practice of this feature of the process. It has been found that the use of a colloid mill as a homogenizer in place of the conventional cream homogenizer effects the desired degree of mixing while avoiding an undesired breaking up of the butter fat particles. The same result can be obtained by using an ordinary cream homogenizer and discharging the composition from that homogenizer under conditions in which the pressure prevailing within the homogenizer is maintained within a range between 100 and 1000 pounds per square inch.

*Example 1*

33.75 pounds of cottage cheese containing 23% butter fat and 7.72% serum solids were mixed with 0.75 pound of ordinary table salt, 0.50 pound of locust bean gum and 6.75 pounds of a starter. The mixing operation was performed by placing these ingredients in a jacketed mixer and operating the agitator at high speed for a period of ten minutes at a temperature of 60° F. 41.25 pounds of 80% cream in a plastic condition were then added in gradual increments over a period of ten minutes while the mixture was maintained at 60° F. and agitated at high speed. Six pounds of water were added to the mixture and the operation of the agitator contained at high speed during such addition. The heat was then turned on until a temperature of 132° F. was reached and the material passed from the jacketed mixer through a homogenizer of 1,000 gallons capacity operating at a pressure of 3,500 pounds to effect very intimate mixing of the ingredients. The resulting product had a butter fat content of 37.39%. After cooling it had a smooth, creamy texture.

*Example 2*

A batch similar to that of Example 1 was made up and agitated in the mechanical agitator, as in Example 1. The material was then passed through a colloid mill to effect homogenization.

The material discharged from the colloid mill was run into a container and allowed to cool to a temperature of 40° F. The cooled cream cheese was thereafter diluted with hot water at a temperature of approximately 150° F. in sufficient proportion to reduce its fat content to 5.4% and sodium bicarbonate was added in sufficient ratio to reduce the acidity from .9% to .15%. It was then passed through a centrifugal separator at a temperature of 140° F. to effect centrifugation and separation of sweet cream from the remaining mixture. The separation resulted in the production of a sweet cream having a butter-fat content of 69.2%.

Modifications will be obvious to those skilled in the art and I do not therefore wish to be limited except by the scope of my sub-joined claims as interpreted in the light of the generic spirit of the invention.

I claim:

1. A process of manufacturing cream cheese which comprises forming a composition consisting essentially of casein, butter fat and water, adding starter to said ingredients in substantially the amount desired in the finished cream cheese product, intimately mixing said ingredients, cooling the composition resulting from the mixing operation, and avoiding substantially any acid development in the composition.

2. A process of manufacturing cream cheese which comprises forming a composition consisting essentially of casein, cream having a butter fat content of over 65%, and water, adding starter to said ingredients in substantially the amount desired in the finished cream cheese product, intimately mixing said ingredients, cooling the composition resulting from the mixing operation, and avoiding substantially any acid development in the composition.

3. A process of manufacturing cream cheese which comprises forming a composition consisting essentially of casein, butter fat and water, adding starter to said ingredients in substantially the amount desired in the finished cream cheese product, mixing said ingredients by discharge from a pressure of the order of 100–1000 pounds per square inch to atmospheric pressure, cooling the composition resulting from the mixing operation, and avoiding substantially any acid development in the composition.

4. The process of manufacturing a cream cheese which comprises forming a composition consisting essentially of casein, cream having a butter fat content of over 65% butter fat, water, and starter in substantially the amount desired in the finished cream cheese product, intimately mixing said ingredients by discharge from a pressure not substantially in excess of 1000 pounds per square inch to atmospheric pressure whereby a sufficient mixing of the ingredients is obtained while the butter fat particles are retained sufficiently large to permit their efficient subsidence from the liquid vehicle under centrifugal forces used in the creamery industry, and avoiding substantially any acid development in the composition.

5. In a process of manufacturing cream cheese from a composition consisting essentially of casein, butter fat and water, the steps comprising adding starter to said ingredients in substantially the amount desired in the finished cream cheese product, heating said composition to prevent substantially any acid development therein, intimately mixing said ingredients, and cooling the composition resulting from the mixing operation.

6. The process of manufacturing cream cheese from a composition consisting essentially of casein, butter fat and water, the steps comprising adding to said ingredients in substantially the amount desired in the finished cream cheese product starter which has been fixed to avoid substantially any further acid development thereby, intimately mixing said ingredients, and cooling the composition resulting from the mixing operation.

7. A process of manufacturing a cream cheese which comprises forming a composition consisting essentially of casein, a true cream containing over 65% butter fat, starter and water, intimately mixing said ingredients and cooling the composition resulting from the mixing operation.

8. In a process of manufacturing a cream cheese, the steps comprising compounding a butter fat containing material consisting of a true cream having a butter fat content of over 65% with materials consisting essentially of casein, water and starter, and thoroughly mixing said ingredients.

9. In a process of manufacturing a cream cheese, the steps comprising compounding a butter fat containing material consisting of a true cream having a butter fat content of over 65% with materials consisting essentially of casein, starter and water, and thoroughly mixing said ingredients by discharge from a pressure of 100–1000 pounds per square inch to atmospheric pressure.

10. In a process of manufacturing a cream cheese, the steps comprising compounding a butter fat containing material consisting of a source of butter fat having a butter fat content of over 65% with materials consisting essentially of casein, starter and water, and thoroughly mixing said ingredients by discharging from a pressure of 100 to 1000 pounds per square inch to atmospheric pressure.

CASPAR P. SHARPLESS.